Figure 1:
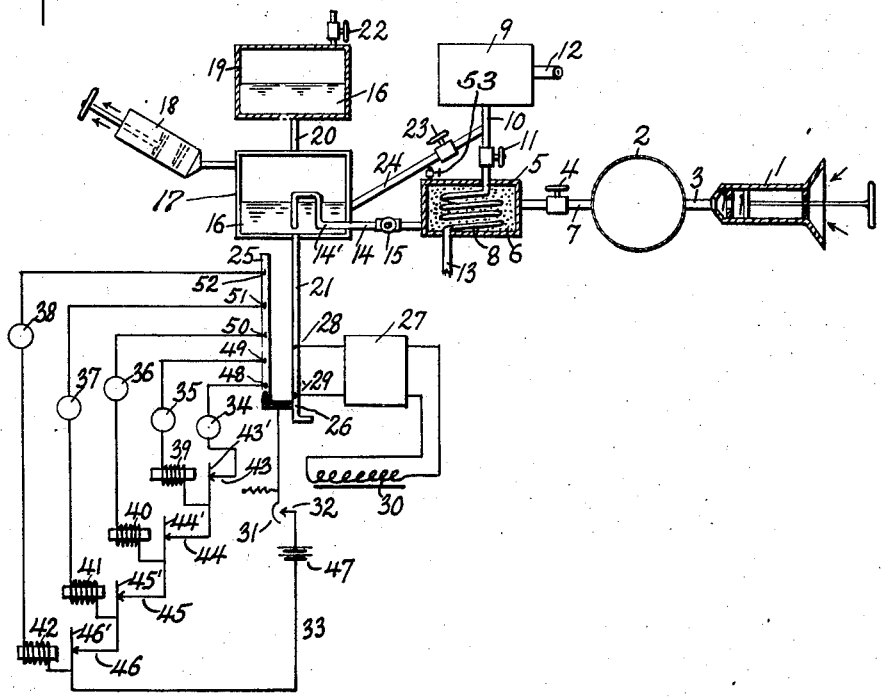

April 10, 1945.   O. T. FRANCIS   2,373,112
APPARATUS FOR THE SUPPLY, DETECTION, SEPARATION OR DETERMINATION
OF THE CONCENTRATION OF A GAS OR GASES
Filed Feb. 13, 1937

INVENTOR

BY OLIVER T. FRANCIS.

ATTORNEY

Patented Apr. 10, 1945

2,373,112

UNITED STATES PATENT OFFICE 2,373,112

APPARATUS FOR THE SUPPLY, DETECTION, SEPARATION, OR DETERMINATION OF THE CONCENTRATION OF A GAS OR GASES

Oliver T. Francis, United States Marine Corps

Application February 13, 1937, Serial No. 125,564

5 Claims. (Cl. 23—254)

(Granted under the act of March 3, 1883, as amended April 30, 1928; 370 O. G. 757)

My invention relates to an apparatus capable of supplying, detecting, separating or determining the concentration of a gas or gases.

In application, Serial No. 125,563, filed February 13, 1937, I have described an apparatus which will, among other things, not only detect a gas but will also selectively detect the presence of a plurality of gases or one of a plurality of gases. While the apparatus described therein proved to be an entirely operative and useful structure, it nevertheless required considerable equipment for carrying out the function of selective gas detection and furthermore could not detect the presence of a gas or gases below a predetermined concentration. At times it becomes necessary to detect a gas or gases which may be present in abnormally low concentrations and/or present at a low vapor pressure or pressures; and if the gases be toxic it may be desirable to accomplish the detecting function at a vapor pressure far below that harmful to man. Also occasions may arise where the selective detection of a plurality of gases with a minimum of equipment would prove extremely useful.

When dealing with a gas or gases at a low vapor pressure or pressures the problem of effective detection involves that of supplying the gas or gases in such a state to a substance or medium that relatively large quantities thereof may be absorbed thereby. There is a large body of substances, of which charcoal and water are illustrative, that absorbs gases in direct proportion to their respective vapor pressures and inversely in accordance with the temperatures of said substances. In carrying out my invention I employ one or more of the aforementioned substances and increase the vapor pressure of the gas or gases to thus insure the absorption of relatively large quantities thereof by the said substance or substances. The vapor pressure of the gas is increased by compressing or heating the same, or in any other suitable manner. One feature of my invention, therefore, resides in the provision of instrumentalities for increasing the vapor pressure of a gas or gases and for supplying the same in this state to a substance to thus insure the absorption of relatively large quantities thereof.

With a view to providing a simplified apparatus for the selective detection of a plurality of gases or one of a plurality of gases I employ a movable medium to different portions of which the gases when separated are presented for absorption. A separation of gases is effected by first condensing the same and then progressively heating the condensate so formed to insure the evaporation of the gases in the order of their boiling points. This procedure is made possible due to the fact that the vapor pressure of gases at their melting points is very low and increases to 760 millimeters of mercury at their boiling points; and that the melting and boiling points of various gases are widely different. Some of these values for certain gases are tabulated as follows:

| Gas | Melting point, ° C. | Boiling point, ° C. |
| --- | --- | --- |
| Carbon dioxide | | −79 |
| Chlorine | −102 | −33.6 |
| Phosgene | −118 | 8.2 |
| Lewisite | −18.2 | 190 |
| Mustard | 14 | 228 |

Therefore, aside from the detecting function of my apparatus another feature of my invention resides in the provision of instrumentalities for separating a plurality of gases which gases may or may not have been previously extracted from the ambient atmosphere.

For ascertaining the nature of the gases present means is provided which is selective in its operation for detecting the presence of any absorbed gases in the movable medium. As illustrative of one such means which I may employ, I provide an electrical system which includes a source of electromotive force, a plurality of circuits and means responsive to the temperature of the movable medium for preparing the circuits for energization one at a time. The movable, gas absorptive medium is heated along with the gas condensate; and each circuit is adapted for the detection of a separate gas including for this purpose means for advising the observer of the presence of its assigned gas when the circuit is energized. Finally, means is provided which is responsive to any absorbed gas in the movable medium for closing only the circuit assigned for its detection thus insuring the selective detection of a plurality of gases or one of a plurality of gases.

In determining the concentration of a gas or gases with my apparatus I first supply the gas or gases to the apparatus in an amount in excess of that necessary to enable their detection, which may be for a period of five minutes, for example. The detecting operation, after having been once performed, is then repeated, the period or time of supply of the gas or gases, however, being reduced to a point which is just sufficient to allow their redetection, the time of supply as aforesaid being a measure of the concentration of the gas or gases.

With the foregoing preliminary discussion in view, it is among the several objects of my invention to provide an apparatus for detecting the presence of a gas or gases at low vapor pressure; for determining the concentration of a gas or gases; for supplying a gas or gases which may be present at low vapor pressure in such a state to an absorptive medium that relatively large quantities are absorbed thereby; for selectively detecting the presence of a plurality of gases or one of a plurality of gases wherein the component parts of the apparatus and the method steps for accomplishing the stated function are reduced to a minimum; for separating a plurality of gases from each other; for extracting a plurality of gases from the ambient atmosphere and separating the gases so extracted from each other; and for building up the vapor pressure of a gas or gases by absorbing the same in one substance and thereafter by increasing the temperature of said substance and/or lowering the pressure to which the substance is subjected, absorbing the gas or gases at an increased vapor pressure in a second substance.

Other objects and many of the attendant advantages of this invention will be readily appreciated as the same becomes better understood by reference to the following description when considered in connection with the accompanying drawing, wherein the single figure illustrates one embodiment of the present invention.

Turning now to the drawing, there is shown at 1 a pump of any convenient design for supplying the gaseous fluid to be analyzed to a container 2 through a conduit 3. A valve 4 is positioned on the outlet side of the container 2 and when closed enables the supply of the gas to the container 2 and the compression thereof with a resultant increase in its vapor pressure. If, for example, the gaseous fluid to be analyzed is a portion of the ambient atmosphere which contains certain gases at a low vapor pressure whose presence it is desired to detect, the supply of a portion of the atmosphere to the container 2 under pressure will increase the vapor pressure of the aforesaid constituent gases and thus enable their subsequent absorption by certain mediums to be described hereinafter. Furthermore, if the gas or gases whose presence it is desired to detect are present in low concentrations a sufficient amount thereof may first be accumulated within the container 2 before supplying the same to the remaining portions of the apparatus for analysis.

A container 5 provided with a valve 53 and housing a suitable absorptive medium 6 is connected by means of a conduit 7 to the gas container 2 to thus enable the supply of any compressed gas to the medium 6 for absorption when the valves 4 and 53 are in open positions. The absorptive medium 6 is chosen such that it will selectively absorb the toxic and/or non-toxic gas or gases whose presence it is desired to detect. Where the presence of a toxic gas or gases in the ambient atmosphere is to be detected charcoal may be conveniently employed although many other substances will suggest themselves to those skilled in the art which will be equally suitable for this purpose.

For removing any absorbed gas or gases from the absorptive medium 6 I employ a suitable heating means which comprises a coil 8 positioned within and surrounded by the absorptive medium 6, a container 9 and a conduit 10 and valve 11 for connecting the coil 8 and container 9. Any suitable heat transfer medium known to the prior art may be supplied to the container 9 through a conduit 12, such heat transfer medium upon opening of the valve 11 being furnished to the coil 8 and after circulating through the said coil being exhausted by a conduit 13. Steam may be conveniently employed for heating the gas absorptive medium 6; but I do not desire to be restricted thereto since, as previously pointed out herein, any heat transfer medium known to the prior art may be utilized. A conduit 14 and valve 15 serve to conduct any gas or gases liberated from the absorptive medium 6 to a second absorptive medium 16 in a container 17 for absorption thereby. It is to be observed at this point that any gas or gases removed from the absorptive medium 6 by heating the same are removed at an increased vapor pressure and in this state are supplied to the medium 16 for absorption. Since the gases are supplied to this latter medium at an increased vapor pressure substantial quantities of the gases will be absorbed thereby which otherwise would not be possible.

As an alternative means for removing any absorbed gases from the medium 6 I may employ a pump 18 for reducing the pressure to which this medium is subjected. Any reduced pressure within the container 17 is effectively transmitted to the absorptive medium 6 by the conduit 14 since conduit 21 is of such vertical length that a reduction in pressure in 17 does not materially affect the flow of liquid therein. If desired, I may employ both the pump 18 and the heating means previously described herein for removing any absorbed gas or gases from the medium 6 and for supplying the same to the second medium 16 for absorption.

The fluid medium 16 is supplied from a container 19 by means of a conduit 20 to the container 17; and is withdrawn from this latter container through the conduit 21 of glass or any other suitable insulating material to a convenient point of discharge. The fluid in the supply container 19 is replenished from time to time by means of the valve 22. Thus, there is a continuous flow of the fluid medium 16 from the container 19, through conduit 20 into container 17; and from thence through the conduit 21 to a convenient point of discharge. The rate of flow of the fluid medium is regulated such that there will be at all times but a relatively small body of the medium within the container 17 to thus insure as high a concentration as possible of any absorbed gas within the medium.

In choosing the fluid medium 16 one must be selected which will alter its electrical conductivity upon the absorption of any gas therein whose presence it is desired to detect. Such a medium may for example be a solution of water and alcohol, or any other aqueous solution, or any other substance which will satisfy the previously stated requirements. Where it is only necessary to detect the presence of a single gas this gas is supplied at an increased vapor pressure directly to the medium 16 where it is absorbed in copious quantities. Where, however, it becomes necessary to detect the presence of a plurality of gases at least all of the gases but one must first be condensed. In order to accomplish this, the movable medium 16 may be initially supplied at a temperature such that the first of the gases to be detected, namely the lowest boiling point gas, is not condensed but passes directly from the medium 6 into solution with the movable medium 16 where it is ionized with attendant alteration in the electrical conductivity of the medium. The remaining gases liberated from the absorptive medium 6 are condensed in the portion 14' of the conduit 14 which projects into the container 17 and is submerged below the surface of the fluid medium 16. Condensation of these latter gases is effected by the fluid medium 16 initially supplied at a liquefaction temperature and surrounding the portion 14' of the conduit 14. Any refrigeration apparatus known to the prior art may be employed for insuring the supply of the fluid medium 16 at the desired temperature.

For separating the gases in the order of their boiling points and thereby insuring the presentation of the gases so separated to different portions of the movable medium 16, there is provided means for progressively heating the condensate previously formed and accumulated in the portion 14' of the conduit 14. This means includes a valve 23 and a branch conduit 24 connected to the conduit 10 of the previously described heating means and to the container 17 as shown thereby insuring the supply of the heating medium within the receptacle 9 to a point within the fluid medium 16. By controlling the valve 23 the fluid medium 16 may be progressively heated with attendant progressive heating of the condensate accumulated within the portion 14' of the conduit 14. The temperature of the movable medium 16 may be indicated by any suitable means, such as the thermometer 25, the end portion 26 of which is closed and the closed portion positioned to contact the fluid medium proceeding along the conduit 21.

The movable absorptive medium 16, as previously pointed out, is chosen such that its electrical conductivity is changed by the absorption of any gas therein such a change in electrical conductivity occasioned by gas absorption being detected by any convenient means such as, for example, any suitable amplifying unit 27 known to the prior art; it being understood, of course, that the unit includes all necessary sources of electromotive force for detecting any change in the electrical conductivity of the movable medium as well as for effecting and insuring amplification. The input side of this amplifying unit 27 includes two electrodes 28 and 29 positioned within the insulating conduit 21 as shown and in the path of the fluid medium. Thus short circuiting of the electrodes by the conduit is effectively prevented. In the output circuit of this unit there is shown a solenoid 30 for cooperating with and actuating to a closed position under predetermined conditions a movable, normally open contact 31 of a switch which is identified in general by the reference character 32. The solenoid 30 and switch 32 together constitute a relay. It is obvious, however, that any suitable indicating means may be substituted for the solenoid 30 and associated apparatus for advising the observer of any change in the electrical conductivity of the movable medium attending any gas absorption therein. Such an indicating means in conjunction with the thermometer 25 would enable the detection of a gas or a plurality of gases. This is possible since the thermometer will record the temperature of evaporation or the boiling point of any gas and the indicating means will advise the operator of the presence of any such absorbed gas in the movable fluid medium. By referring to a table containing the boiling points of various gases, the gas or gases absorbed by the movable medium are quickly determined.

For automatically and selectively determining the presence of a gas or a plurality of gases there is provided an electrical system identified in general by the reference character 33. This system includes a plurality of suitable indicating devices 34, 35, 36, 37 and 38 which may be either visual and/or audible in character; solenoids 39, 40, 41 and 42; stationary switch contacts 43, 44, 45, 46; movable contacts 43', 44', 45' and 46' which are normally in engagement with their stationary contacts 43, 44, 45, 46 and are adapted to be actuated by their respective solenoids 39, 40, 41, 42; and a source of electromotive force 47 adjacent the normally open system switch 32. Each of the solenoids and its associated switch constitute a relay. Stationary contacts 48, 49, 50, 51 and 52 within the thermometer interior are arranged for cooperation and engagement with the expansible mercury column and are connected respectively to the indicating devices 34, 35, 36, 37 and 38. The system switch 32 is also connected to a stationary contact within the mercury of the thermometer 25. Although the system is shown for illustrative purposes as arranged for the detection of five separate gases, I do not desire to be restricted thereto since the system may be arranged for the detection of any number of desired gases.

In the electrical system 33 there are thus formed five electrical circuits for the detection of five separate gases which for illustrative purposes have been chosen as carbon dioxide, chlorine, phosgene, Lewisite, and mustard gas. It is to be emphasized, however, that the system can be designed for the detection of any number of toxic and/or non-toxic gases. The circuit for the detection of any carbon dioxide extends from the system or master switch 32, through the mercury column of the thermometer 25, to the contact 48, indicator 34, through the contacts 43, 43', 44, 44', 45, 45', 46, 46' to the source of electromotive force 47. The circuit employed for detecting the presence of any chlorine includes the system switch 32, the mercury column of the thermometer 25, stationary contact 49, indicator 35, solenoid 39, contacts 44, 44', 45, 45', 46, 46' and the source of electromotive force 47. The following elements are included in the circuit for the detection of any phosgene gas, namely, system switch 32, the mercury column of the thermometer 25, stationary contact 50, indicating means 36, solenoid 40, contacts 45, 45', contacts 46, 46', and the source of electromotive force 47. The circuit for the detection of any Lewisite comprises the system switch 32, the mercury column of the thermometer 25, the stationary contact 51, the indicating means 37, the solenoid 41, contacts 46, 46' and source of electromotive force 47. The elements which go to make up the circuit for detecting the presence of any mustard gas include the system switch 32, the mercury column of the thermometer 25, the stationary contact 52, the indicating means 38, the solenoid 42 and the source of electromotive force 47. The stationary contacts 48, 49, 50, 51 and 52 are positioned within the thermometer 25 at points corresponding to different mercury levels, which levels in turn are determined by the approximate boiling points of the gases whose presence it is desired to detect and which in the case here illustrated are carbon dioxide, chlorine, phosgene, Lewisite and mustard gas. Thus, as the mercury gradually rises due to the progressive heating of the fluid medium 16, one circuit at a time is prepared for energization and if any gas is absorbed in the movable medium 16 the circuit assigned for its detection will be energized to the exclusion of the others by closure of the normally open system switch 32.

The operation of the apparatus will now be described, it being assumed that the ambient atmosphere to be analyzed contains carbon dioxide, chlorine, phosgene, Lewisite and mustard gas, all at low vapor pressure and that the presence of these gases is unknown to the operator. Furthermore, it is assumed that the medium 6 within the container 5 is such that it will absorb and extract these gases from the ambient atmosphere. For this purpose the medium may be, for example, charcoal. Furthermore, the movable medium 16, which for illustrative purposes may be chosen as a solution of alcohol and water, is initially supplied at a temperature such that the lowest boiling point gas, namely the carbon dioxide, is not condensed but passes directly from the absorptive medium 6 after liberation therefrom into solution with the movable medium 16 where it is ionized with attendant alteration in the electrical conductivity of the said medium. The remaining gases, namely chlorine, phosgene, Lewisite, and mustard gas, are initially condensed in the portion 14' of the conduit 14.

In operation, the valve 4 on the outlet side of the container 2, is first closed and the pump 1 then set in operation to supply substantial quantities of the ambient atmosphere to the container 2. Since those gases in the atmosphere whose presence it is desired to detect are initially present at low vapor pressures, their respective vapor pressures will be increased due to their compression within the container 2. After a sufficient quantity of the atmosphere has been accumulated within the container 2 the valves 4 and 53 are simultaneously opened, thus causing the supply of the gaseous medium within the container under pressure to the charcoal 6. The carbon dioxide, chlorine, phosgene, Lewisite, and mustard gas are extracted from the ambient atmosphere by the charcoal 6 in substantial quantities due to the increased vapor pressure of these gases. After the absorption of the desired quantities of gases by the charcoal 6 the valves 4 and 53 are closed. Thereupon the valves 11 and 15 are opened and steam traversing the coil 8 insures the removal of the absorbed gases in the charcoal 6. Instead of liberating the absorbed gases from the medium 6 by the heating means, the pump 18 may be employed or the pump 18 may be used in conjunction with the heating means if desired. The carbon dioxide removed from the charcoal 6 proceeds along the conduit 14 and passes immediately into solution with the movable absorptive medium 16 without any prior condensation. The chlorine, phosgene, Lewisite and mustard gas, however, are condensed in the portion 14' of the conduit 14 due to the fact that the fluid medium 16 is initially supplied at a temperature below their liquefaction temperatures.

The initial temperature of the fluid medium 16 is such that the mercury column within the thermometer 25 engages the stationary contact 48 and thus prepares the circuit assigned for the detection of the carbon dioxide for energization. The passage of the carbon dioxide into solution with the fluid medium 16 causes its ionization with the result that the electrical conductivity of the medium is increased. As the ionized fluid medium 16 comes in contact with the electrodes 28 and 29 of the amplifying unit 27 the solenoid 30 is energized resulting in the closure of the normally open system switch 32. The circuit assigned for the detection of the carbon dioxide and including the system switch 32, the mercury column of the thermometer 25, stationary contact 48, the indicating device 34, the contacts 43, 43', 44, 44', 45, 45', 46, 46' and the source of electromotive force 47 is now closed with attendant energization of the indicating device 34. The operator is thus immediately advised that carbon dioxide is present.

In order to determine whether or not chlorine is present the observer now opens the valve 23 and raises the temperature of the fluid medium 16 to the temperature at which any chlorine, if present, will boil off or evaporate from the condensate within portion 14' of the conduit 14. Valve 15 may be closed at this time and during subsequent heating operations to prevent gases from returning to the container 5 and reabsorbing on the charcoal 6, which will occur if the charcoal has cooled sufficiently. The chlorine present therein will evaporate and pass into solution with the fluid medium 16 and alter its electrical conductivity. Simultaneously with the evaporation of the chlorine the mercury within thermometer 25 has now risen to a point where it engages the stationary contact 49 of the circuit assigned for the detection of any chlorine gas. When now the fluid medium 16 whose conductivity has been altered by the chlorine bridges the electrodes 28 and 29 of the amplifying unit 27 the system switch 32 will again be closed by energization of the solenoid 30. Closure of the system switch results in energization of the circuit assigned for the detection of any chlorine gas and including the mercury column of the thermometer 25, the stationary contact 49, the indicating device 35, the solenoid 39, contacts 44, 44', 45, 45', 46, 46' and the source of electromotive force 47. Closure of this circuit results in energization of the solenoid 39 which thereupon causes the movable contact 43' to move out of engagement with its stationary contact 43 and thereby interrupts any current flow in the circuit assigned for the detection of carbon dioxide. Thus there is now energized only one circuit, namely, the circuit assigned for the detection of any chlorine gas. The energization of the indicating device 35 advises the observer of the presence of the chlorine gas.

In order to determine whether or not any phosgene is present the observer again opens the valve 23 for a sufficient period of time to raise the temperature of the fluid medium 16 to that at which any phosgene if present in the condensate will evaporate. When this temperature has been attained the valve 23 is closed and the mercury within a thermometer will now be in engagement with the stationary contact 50 thus preparing for energization the circuit assigned for the detection of this gas. The phosgene evaporated from the condensate within the portion 14' of the conduit 14 now passes into solution as in the preceding cases and alters the electrical conductivity of the fluid medium 16 which alteration is again detected by the amplifying unit 27 with consequent energization of the solenoid 30 and closure of the system switch 32. The circuit assigned for the detection of the phosgene and including the mercury column of the thermometer 25, stationary contact 50, the indicating device 36, solenoid 40, contacts 45, 45', 46, 46', and the source of electromotive force is now energized. Since the solenoid 40 causes the movable contact 44' to disengage the stationary contact 44 no current flow is possible in the circuits assigned for the detection of carbon dioxide and chlorine with the result that one circuit alone is energized, namely, the circuit assigned for the detection of the phosgene. The energization of the indicating device 36 advises the observer of the presence of any phosgene.

By continuing the progressive heating of the fluid medium 16 through a range of temperatures necessary to effect the vaporization of the Lewisite and mustard gas in the condensate, the circuits assigned respectively for the detection of the Lewisite and mustard gas are successively energized in a manner similar to the energization of the circuits previously described. Thus, it is evident that the apparatus of my invention will among other things selectively detect the presence of one of a plurality of gases.

When the nature of the gases present in the ambient atmosphere has been determined, the time that the valve 4 remains open is shortened until the gases absorbed by the charcoal 6 are just sufficient in quantity to enable their redetection by the apparatus. The time of supply of the gases sufficient to enable their redetection will vary inversely with the concentration of the gases in the ambient atmosphere and therefore will be an indication of their concentration.

While the apparatus of my invention has been described in operation as a gas analyzing device I do not desire to be restricted to this particular use since it can be advantageously employed for recovering valuable gases from the ambient atmosphere and for separating these gases from each other by the process of fractional separation here illustrated. Furthermore, the valves 4, 53, 11, 15 and 23 need not be manually operated. They may, if desired, be operated electrically or mechanically in their proper sequence by any means known to the prior art.

According to the provisions of the patent statutes I have set forth the principle and mode of operation of my invention and have illustrated and described what I now consider to represent its best embodiment. However, I desire to have it understood that within the scope of the appended claims the invention may be practiced otherwise than as specifically illustrated and described.

The invention herein described and claimed may be used and/or manufactured by or for the Government of the United States of America for governmental purposes without the payment of any royalties thereon or therefor.

I claim:

1. In an apparatus for detecting the presence of one or more toxic gases in a gaseous medium, in combination, a closed container, compressor means connected to said container for delivering and compressing therein a quantity of said gaseous medium sufficient for test purposes, a first closed absorbing receptacle arranged to contact a gas with an absorbent therein, and a release valve on said first receptacle for selectively venting it to atmosphere, a first conduct means including a valve means, connecting said container and said first receptacle, a second closed absorbing receptacle arranged to contact a gas with a liquid absorbent whose conductivity is raised upon absorption of any toxic gaseous component, a second conduit means connecting said first receptacle and said second receptacle at a lower portion of the latter to permit the passage into said second receptacle of any gas released from the gas absorbing material contained in said first receptacle, means connected to said first receptacle and arranged to reduce the gas absorptive capacity of the absorbent in said first receptacle, draining means connected to said second receptacle and arranged to drain a portion of the liquid absorbent therefrom while maintaining a body of the liquid absorbent in said second receptacle, and indicating means associated with said liquid draining means and arranged to indicate the relative conductivity of the liquid absorbent drained therethrough.

2. In an apparatus for detecting the presence of one or more toxic gases in a gaseous medium, in combination, a closed container, compresser means connected to said container for delivering and compressing therein a quantity of said gaseous medium sufficient for test purposes, a first closed absorbing receptacle arranged to contact a gas with an absorbent therein, and a release valve on said first receptacle for selectively venting it to the atmosphere, a first conduit means including a valve means, connecting said container and said first receptacle, a second closed absorbing receptacle arranged to contact a gas with a liquid absorbent whose conductivity is raised upon absorption of any toxic gaseous component, a second conduit means connecting said first receptacle and said second receptacle at a lower portion of the latter to permit the passage into said second receptacle of any gas released from the gas absorbing material contained in said first receptacle, heating means connected to said first receptacle and arranged to increase the temperature of said first receptacle and the absorbent therein, draining means connected to said second receptacle and arranged to drain a portion of the liquid absorbent therefrom while maintaining a body of the liquid absorbent in said second receptacle, and indicating means associated with said liquid draining means and arranged to indicate the relative conductivity of the liquid absorbent drained therethrough.

3. In an apparatus for detecting the presence of one or more toxic gases in a gaseous medium, in combination, a closed container, compressor means connected to said container for delivering and compressing therein a quantity of said gaseous medium sufficient for test purposes, a first closed absorbing receptacle arranged to contact a gas with an absorbent therein, and a release valve on said first receptacle for selectively venting it to the atmosphere, a first conduit means including a valve means, connecting said container and said first receptacle, a second closed absorbing receptacle arranged to contact a gas with a liquid absorbent whose conductivity is raised upon absorption of any toxic gaseous component, a second conduit means connecting said first receptacle and said second receptacle at a lower portion of the latter to permit the passage into said second receptacle of any gas released from the gas absorbing material contained in said first receptacle, exhaust pump means connected to said second receptacle at an upper portion thereof, draining means connected to said second receptacle and arranged to drain a portion of the liquid absorbent therefrom while maintaining a body of the liquid absorbent in said second receptacle, and indicating means associated with said liquid draining means and arranged to indicate the relative conductivity of the liquid absorbent drained therethrough.

4. The apparatus described in claim 1 wherein said second conduit means has a substantially horizontal portion extending within and adjacent the bottom of said second receptacle and terminating in a vertically extending inverted U-shaped portion arranged to trap liquids in said horizontal portion and to discharge gases from said horizontal portion into said second receptacle adjacent the bottom thereof, and wherein said second receptacle is provided with means for heating its contents and that part of said second conduit within the receptacle.

5. The apparatus described in claim 1 wherein a second indicating means is associated with said liquid draining means and arranged to indicate the temperature of the liquid absorbent drained therethrough.

OLIVER T. FRANCIS.